United States Patent
Goralski

(10) Patent No.: US 10,235,804 B2
(45) Date of Patent: Mar. 19, 2019

(54) DISPLAY SYSTEM

(75) Inventor: Rafal Goralski, Cardiff (GB)

(73) Assignee: SRT Marine System Solutions Limited, Bath (GB)

( * ) Notice: Subject to any disclaimer, the term of this patent is extended or adjusted under 35 U.S.C. 154(b) by 521 days.

(21) Appl. No.: 13/430,719

(22) Filed: Mar. 27, 2012

(65) Prior Publication Data

US 2012/0249786 A1 Oct. 4, 2012

(30) Foreign Application Priority Data

Mar. 31, 2011 (GB) .................................. 1105454.1

(51) Int. Cl.
| | |
|---|---|
| G06T 15/00 | (2011.01) |
| H04N 5/222 | (2006.01) |
| G06T 19/00 | (2011.01) |
| G01C 21/36 | (2006.01) |
| G06F 3/0481 | (2013.01) |

(52) U.S. Cl.
CPC ............ G06T 19/003 (2013.01); G01C 21/36 (2013.01); G06F 3/04815 (2013.01)

(58) Field of Classification Search
CPC ... G06T 19/00; G06T 19/006; G06F 3/04815; G06F 3/04845; G01C 21/20
USPC ......................................................... 345/633
See application file for complete search history.

(56) References Cited

U.S. PATENT DOCUMENTS

| | | | |
|---|---|---|---|
| 5,583,972 A | 12/1996 | Miller | |
| 5,781,146 A | 7/1998 | Frederick | |
| 7,746,343 B1 | 6/2010 | Charanaya | |
| 8,099,234 B1 * | 1/2012 | Frank | G01C 23/005 701/436 |
| 8,400,548 B2 * | 3/2013 | Bilbrey | G06F 1/1694 348/333.01 |
| 8,436,872 B2 * | 5/2013 | Wright et al. | 345/633 |
| 8,605,141 B2 * | 12/2013 | Dialameh | G06F 17/30247 348/157 |

(Continued)

FOREIGN PATENT DOCUMENTS

EP 1720090 11/2006

OTHER PUBLICATIONS

EPO Search Report in counterpart application, dated Oct. 19, 2017, Application No. 12 160 278.3-1902.

(Continued)

*Primary Examiner* — Rebecca A Volentine
(74) *Attorney, Agent, or Firm* — Muskin and Farmer LLC

(57) ABSTRACT

A display system, method, and computer readable storage to provide a visual representation of an environment. A marker is placed by a user tagging a physical location in the environment. When the user looks at the environment using different viewpoints, the visual representation can automatically be adjusted via a programmed processing unit so that the marker would appear in the same physical location in the window each time the viewpoint is changed. For example, if the marker is placed to tag a real world boat in a visual representation, changing the viewpoint would maintain the marker in the same position in the visual representation in the window. By changing viewpoints, an object marked by a marker would remain in the same position in the window while other aspects of the visual representation would automatically change including zoom, rotation, pan, to accommodate the static position of the marker.

9 Claims, 2 Drawing Sheets

(56) References Cited

U.S. PATENT DOCUMENTS

| | | | |
|---|---|---|---|
| 8,994,851 B2* | 3/2015 | Varanasi | G01C 21/20 348/231.3 |
| 9,147,221 B2* | 9/2015 | Grasset | G06T 1/00 |
| 2002/0180809 A1* | 12/2002 | Light | G06F 3/04815 715/852 |
| 2003/0080978 A1* | 5/2003 | Navab et al. | 345/633 |
| 2003/0210228 A1* | 11/2003 | Ebersole | G02B 27/017 345/157 |
| 2003/0210832 A1 | 11/2003 | Benton | |
| 2006/0244745 A1* | 11/2006 | Majer | G06F 3/04815 345/419 |
| 2008/0033641 A1* | 2/2008 | Medalia | G06F 3/04815 701/533 |
| 2008/0192118 A1* | 8/2008 | Rimbold et al. | 348/159 |
| 2008/0300482 A1* | 12/2008 | Mlejnek | G06T 7/0012 600/425 |
| 2009/0079732 A1* | 3/2009 | Fitzmaurice et al. | 345/419 |
| 2009/0079740 A1 | 3/2009 | Fitzmaurice | |
| 2010/0020223 A1* | 1/2010 | Vice | G06T 15/20 348/333.02 |
| 2010/0042923 A1* | 2/2010 | Barcay et al. | 715/715 |
| 2010/0045666 A1* | 2/2010 | Kornmann et al. | 345/419 |
| 2010/0131126 A1* | 5/2010 | He | G01C 21/00 701/14 |
| 2010/0188503 A1* | 7/2010 | Tsai et al. | 348/142 |
| 2011/0130949 A1* | 6/2011 | Arrasvuori | 701/200 |
| 2011/0137561 A1* | 6/2011 | Kankainen | G01S 5/0247 701/300 |
| 2011/0148924 A1* | 6/2011 | Tapley et al. | 345/634 |
| 2011/0279446 A1* | 11/2011 | Castro | G01C 21/20 345/419 |
| 2012/0075341 A1* | 3/2012 | Sandberg | G06F 3/147 345/633 |
| 2012/0320248 A1* | 12/2012 | Igarashi | G01C 21/32 348/333.01 |

OTHER PUBLICATIONS

EPO Search Report, dated Jan. 24, 2017, Application No. 12160278.3-1902/2506220.

* cited by examiner

DISPLAY SYSTEM

CROSS REFERENCE TO RELATED APPLICATIONS

This Application claims benefit under 35 U.S.C. 119 to Great Britain Application No. 1105454.1, filed in the Great Britain Patent Office on Mar. 31, 2011, by inventor Rafal Goralski, which is incorporated by reference herein in its entirety for all purposes.

BACKGROUND OF THE INVENTION

Field of the Invention

The present general inventive concept is directed to a method, apparatus, and computer readable storage medium directed to a display system, method, and computer readable storage for providing a visual representation of an environment.

Description of the Related Art

When navigating a ship within a harbour, a submersible along a seabed or vehicle across a landscape for example, it is necessary to consult charts and maps to obtain information about the environment to ensure an efficient and safe manoeuvring. In this respect, it is necessary to combine information from various sources to establish an awareness of the environment.

Global positioning systems exist which enable a pilot of a ship or an operator of a vehicle for example, to determine their position relative to their surroundings, but such systems do not provide for an interactive representation of the environment so that the operator can obtain a visual representation and awareness of the landscape or bathymetry.

SUMMARY OF THE INVENTION

It is an aspect of the present inventive concept to provide a display system for providing a visual representation of an environment The above aspects can be obtained by (a) an electronic output device and an electronic input device; (b) a processing unit operationally connected to the output device and the input device, the processing unit configured to: (c) receive environment information about an environment; (d) output a window on the output device that displays a representation of the environment with a marker representing a particular physical location in the environment; and (e) display said representation from a plurality of different viewpoints, each viewpoint comprising the marker being displayed at a fixed location within said window, each representation in the plurality of viewpoints is arranged such that the marker represents the particular physical location.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
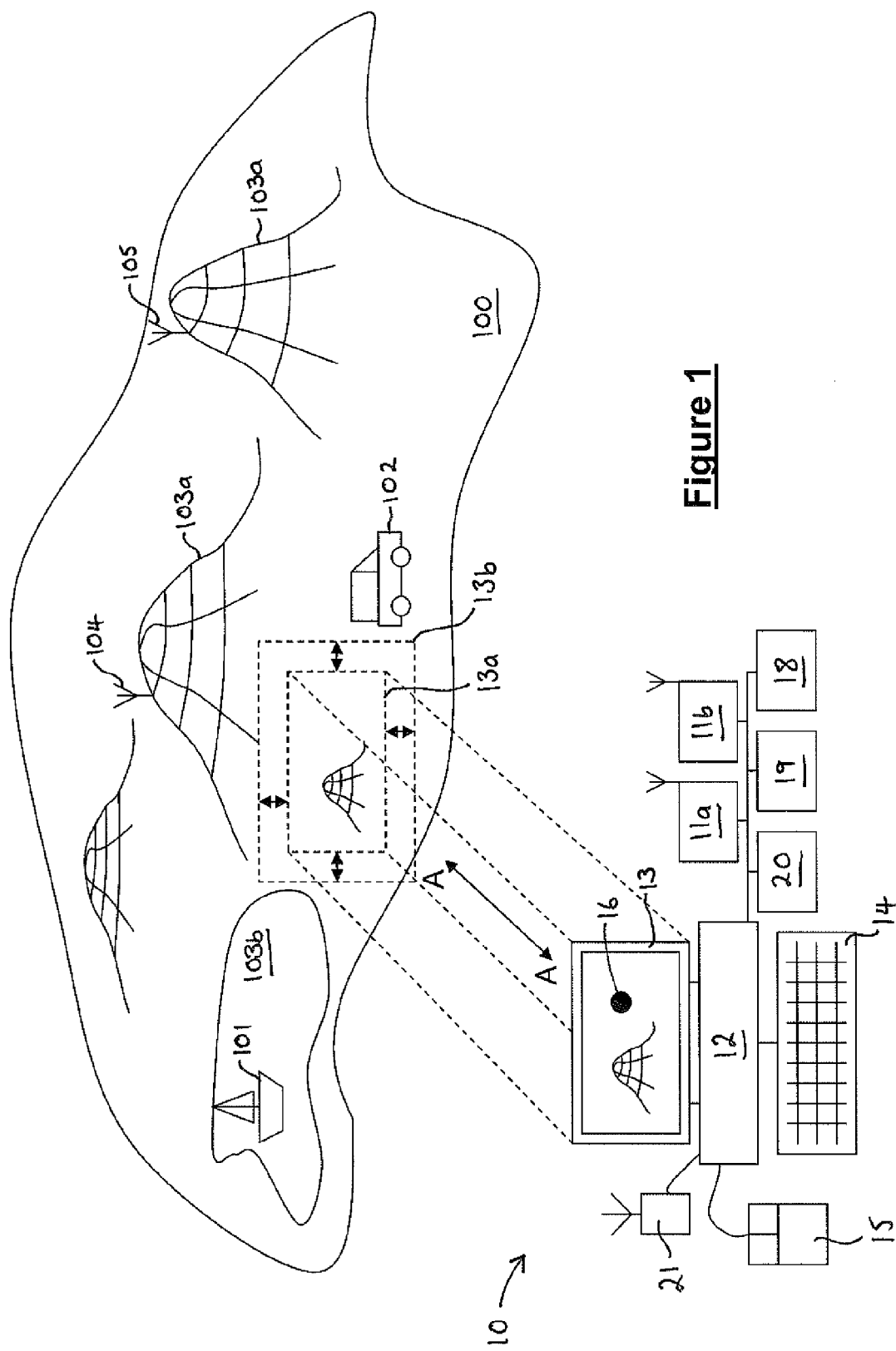
FIG. 1 is a schematic illustration of a display system for displaying at least a portion of a representation of an environment, according to an embodiment.

Reference will now be made in detail to the presently preferred embodiments of the invention, examples of which are illustrated in the accompanying drawings, wherein like reference numerals refer to like elements throughout.

The present inventive concept relates to a method, apparatus, and computer readable storage medium to implement a display system, method, and computer readable storage for providing a visual representation of an environment.

In accordance with the present inventive concept there is provided a display system for providing a visual representation of an environment, the system comprising a processor which is arranged to receive information of the environment from at least one environment sensor and output display signals representative of the sensed information to a display device, the display device comprising a display window, which is arranged to display at least a portion of said representation, the display device being further arranged to display a display reference at a user specified location within said representation, wherein said display window is further arranged to selectively display said portion from one of a plurality of viewpoints from within said representation, each viewpoint comprising the display reference at a fixed location within said window and within said representation.

The display system provides for an interactive virtual representation of an environment through the acquisition of information about the environment from environmental sensors, thereby enabling a user to navigate through the environment. Moreover, the system provides a situational awareness to the user by providing the user with various viewpoints of the environment.

The display device is configured to display a 3-dimensional representation of the environment. A display reference is selectably positioned within said representation by a user. In this situation, the display window is arranged to follow the topography/bathymetry of the representation of the environment as the user navigates the display reference within the representation. The display reference is can also be further selectably positioned at a specified location within said window by a user.

The display window can be rotatable with respect to the representation about an axis comprising the display reference, so that a user can adjust the display direction. The axis can further extend within a plane of the display window.

A visual separation (distance) of the display window from the display reference within said representation is variable. This enables a user to obtain a magnified view of a particular location within the environment for example or a more global view of the environment (e.g., zoom in/out). The system can combine different views, scales and perspectives of an environment into a single cohesive view which allows for a quick and accurate manipulation and navigation, for example through the environment.

The display portion can be selectable by a user by re-positioning the display reference within the visual representation of the environment. The display system can be further configured to selectively display at least one group of environment features, such as marine buoys, buildings, hazardous areas, marine vessels, land vehicles and the like.

The display system can comprise a plurality of sensor modules, which are arranged to acquire information from the at least one environment sensor. The sensor modules comprise modules for sensing dynamic information of the environment, such as traffic, and modules for sensing static information of the environment, such as buildings.

The system further comprises a user interface for enabling a user to input commands to the system. The system can further comprise optimisation modules for optimising the visual representation of the environment, in accordance with the information acquired from the sensor modules and user input commands.

The system can also further comprises surveillance modules which are arranged to maintain real-time spatial relationships between objects within the representation and alert a user to potential dangers in the environment.

The system can further comprise an automated surveillance module which enables a passive surveillance of the environment without requiring any active input by the user. In this respect, the automated surveillance module is configured to provide an automated navigation of a vehicle within an environment. If required however, a user may intervene upon observing the navigation and/or respond to system alerts for example.

The system can further comprise a communication module for communicating with the sensor and/or surveillance information at remote locations. This can also enable an option of remote operation of the system.

Figure 2:
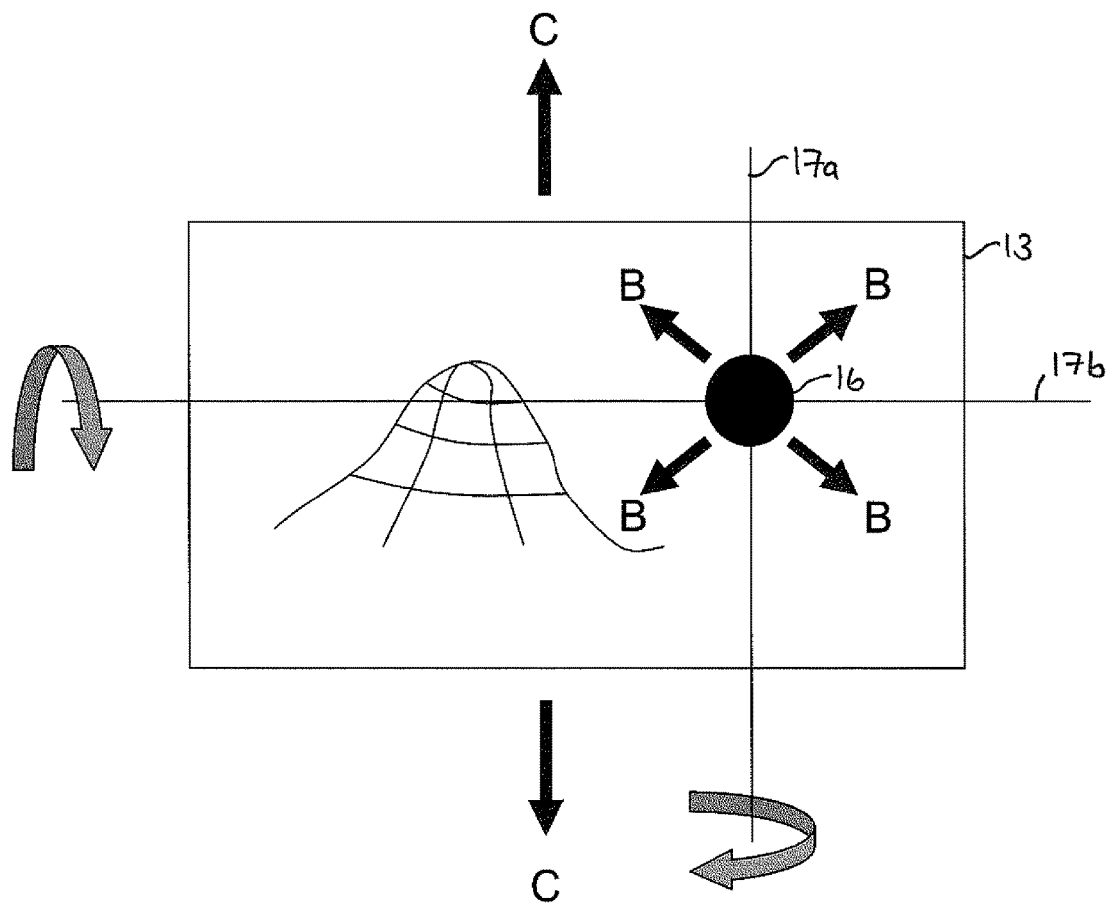
FIG. 2 is a schematic illustration of a display window of the display system illustrated in FIG. 1, according to an embodiment.

FIG. 1 is a schematic illustration of a display system according to an embodiment of the present inventive concept for displaying at least a portion of a representation of an environment. FIG. 2 is a schematic illustration of a display window of the display system illustrated in FIG. 1.

Referring to FIG. 1, there is illustrated a display system 10 for displaying a 3-dimensional visual representation of at least a portion of an environment 100, to an operator (not shown) of a vehicle (not shown). The system 10 may be disposed within a vehicle (not shown) and enables the operator of the vehicle, which may comprise a submersible (not shown), a ship 101 or a car 102, to suitably navigate a vehicle across a landscape 103*a* or upon a lake 103*b* by providing the operator with environment information in the form of a real-life, intuitive visual representation of the environment 100. The system 10 may also be stationed remote to the vehicle being navigated, within a surveillance station (not shown) for example, and thus stationary with respect to the vehicle being navigated.

The system 10 comprises a plurality of sensor modules 11*a*, 11*b* which are arranged to acquire real-time information on dynamic environmental features, such as the movement of vehicles, sea conditions and the like, in addition to static environmental information such as topography and bathymetry. This information may be obtained from transponders 104, RADAR (Radio Direction And Ranging) stations 105, video streams from closed circuit television systems (not shown), SONAR (Sound Navigation And Ranging), LIDAR (Light Detection And Ranging) stations, and the like, in addition to existing charts and plots (not shown) of the environment 100. The sensor modules 11*a*, 11*b* are arranged to retrieve environmental information and output the sensed information to a processor 12 (e.g., microprocessor and associated structure such as cache, bus, clock, etc.), which subsequently processes the information and generates the visual representation on a display screen 13 (e.g., CRT, LCD, etc.). The system 10 further comprises a user interface (input) devices, such as a keyboard 14, a mouse 15, a joystick (not shown) and the like which enable an operator (not shown) to interact with the system 10 and provide operator commands and input to the system 10. Also included (not pictured) is a storage device, e.g., ROM, RAM, non-volatile storage (e.g., hard disc drive), etc. which can store computer readable instructions that can implement any of the features described herein.

The processor 12 is further configured to overlay a reference marker 16 upon the displayed representation so that an operator can select the area of the environment 100 to be displayed by suitably positioning the reference marker 16 at the desired location within the representation using an interface device, such as the mouse 15. The reference marker 16 may comprise a "dot" which may be disposed centrally of the display screen 13 or at any other operator specified location within to the display screen 13.

The marker 16 provides a reference for the operator in selecting the displayed direction relative to the operator (not shown). The displayed direction may be an absolute direction, for example a relocation of the marker at a specified location within the representation to provide an operator with a representation of the selected location. Alternatively, the marker 16 may serve to provide a relative direction, for example a view of the selected location from a different viewpoint from within the representation and in this case, the marker 16 is arranged to remain at a fixed position, namely locked, within the display screen 13, for each viewpoint. Thus, for example, the location of marker 16 would be located in the same physical location in the display screen 13 (or window) as the other viewpoints, thus when viewpoints are changed (and hence the representation being displayed changes) the marker remains in the same physical location on the screen/window. This would be accomplished by adjusting the parameters of the representation (e.g., zooming in/out, panning, rotating, etc.) so that the marker remains in the same physical location in the screen/window (the marker also representing the same physical location in the environment). Thus, for example, if the marker were placed on a boat, then different viewpoints would keep the marker in the same location on the screen/window and would automatically adjust the parameters of the view/representation so that the marker still "points to" (e.g., "tags", "is on") the physical boat in the environment. Thus the boat could be found in the same physical location in the screen/window throughout different viewpoints. As such, the boat can be viewed throughout different viewpoints yet would always appear on the screen/window in the same position. This can be advantageous because while looking at the marker (representing a point or object in the real environment) in different views, the user does not have to move his eyes to see the same point in different views which also avoids confusion when changing views (thus the physical location of marker 16 on the window would not change in the window in different views in this embodiment).

In the case of a change in absolute direction, the display 13 will provide an apparent motion to the operator as the operator slides the marker 16 across the representation of the environment 100, as illustrated by arrows B in FIG. 2 of the drawings. In this case, the system 10 is arranged to operate in one of two modes. In the first mode, the marker 16 is arranged to remain at a selected altitude above or below sea level, as long as the terrain/bathymetry permits, whereas in the second mode, the marker 16 is arranged to remain at a selected altitude above the terrain/bathymetry, and is arranged to follow the contour of the terrain to maintain this altitude as the marker 16 moves across the terrain.

In the case of a change in the relative direction, the marker 16 is arranged to remain at a fixed location within the representation and provides a reference about which the display 13 can pivot to provide a view of the location from all positions around the location. For example, upon positioning the marker upon the hull of a ship 101, then the display system 10 can provide a view from all around the ship 101 from below the hull to above the hull, and thus enable a ship pilot for example, to determine whether there is sufficient water depth to manoeuvre within a harbour (not shown). This change in relative direction is achieved by combining a change in viewing altitude with respect to the representation, as illustrated with arrow C-C, with a rotation of the displayed view about a vertical and/or horizontal axis 17a, 17b which extend within the display screen 13 and which extend through the marker 16 (as illustrated in FIG. 2 of the drawings).

In addition, the operator/user (not shown) can adjust the apparent separation of the display 13 from the marked location (as indicated by arrow A-A) to reduce the separation to obtain a magnified view of the location, and thus obtain a detailed representation of the location, as indicated by the display portion 13a. Alternatively, the operator may increase the apparent separation (distance) to obtain a more global view of the location, as indicated by the display portion 13b.

The system further comprises an optimisation module 18 for optimising the visual representation of the environment 100 depending on the sensed information and operator input commands, for example the operator specified viewing direction. For example, the optimisation module 18 may be configured to restrict the rotation of the viewing direction about the horizontal axis 17b in accordance with the apparent separation of the display screen 13 from the location, to prevent the viewing direction falling from below the terrain surface. As a further example, the optimisation module may be arranged to increase the apparent size of environmental objects as an operator zooms out from a location within the representation, so that the objects remain visible to the operator. This may be further supplemented with a change in the colour of displayed objects, for example.

The system 10 can further comprises a surveillance module 19 for providing real-time information on the separation of the objects, such as obstacles and vehicles, within the environment 100 to alert the operator to potential collision hazards, for example. Similarly, the system 10 further comprises an automated surveillance module which allows for an automated navigation and operation of a vehicle (not shown) within the surveyed environment 100 without the need for any active input from the operator. If required, the system 10 may communicate the information from the sensor and surveillance modules 11, 19, 20, using a communication device 21, to enable a remote operation of the vehicle.

In order to provide a more intuitive representation of the visual representation of the environment, the system is further configured to selectively populate the display with a plurality of groups of environmental objects, such as marine buoys, and vehicles (not shown) proximate to the vehicle (not shown) being manoeuvred.

From the foregoing therefore, it is evident that the display system provides for an improved manoeuvrability and navigation of vehicles, through the provision of an intuitive visual representation of the environment.

Any description of a component or embodiment herein also includes hardware, software, and configurations which already exist in the prior art and may be necessary to the operation of such component(s) or embodiment(s).

Further, the operations described herein can be performed in any sensible order. Any operations not required for proper operation can be optional. Further, all methods described herein can also be stored on a computer readable storage to control a computer.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A display system for providing a visual representation of an environment, the system comprising:
   an electronic output device
   an electronic input device;
   sensor modules configured to acquire real-time information about dynamic features within the environment;
   an electronic processor operationally connected to the output device and the input device and the sensor modules, the processor configured to:
   receive static environment information about topography or bathymetry of the environment;
   acquire from the sensor modules the real-time information about dynamic features within the environment;
   output a window on the output device that displays: a first virtual representation in 3-dimensions of the topography or the bathymetry of a portion of the environment from a first viewpoint using the static environment information with a marker displayed in the first virtual representation, the marker identifying where on the first virtual representation a particular physical location in the environment is located;
   change what is displayed in the window to a second virtual representation in 3-dimensions of the topography or the bathymetry of a portion of the environment from a second viewpoint using the static environment information, the second viewpoint being different than the first viewpoint, the second virtual representation comprising the marker being displayed at a same fixed location within the window as the first virtual representation with the marker identifying where on the second virtual representation the particular physical location in the environment is located, wherein the processor is further configured to selectively populate in real time the displayed first and second virtual representations with the respective acquired real time information about dynamic features within the environment; and
   enable a user to use the input device to: position and reposition the marker in a displayed representation, rotate the displayed representation about an axis comprising the marker, adjust a zoom of the displayed representation, cause the displayed representation to follow topography or bathymetry of the environment's representation as the user moves the marker, and adjust a portion of the environment being displayed in the displayed representation by repositioning the marker.

2. The system according to claim 1, wherein the processor is further configured to automatically display at least one group of environment features.

3. The system according to claim 1, wherein the sensor modules further comprise at least one environment sensor configured to transmit the real-time information about dynamic features within the environment to the processor.

4. The system according to claim 1, wherein the processor is further configured to implement a graphical user interface to enable a user to input commands to the processor.

5. The system as recited in claim 3, further comprising optimisation modules for optimising representation of the environment in accordance with the environment information acquired from the sensor modules and user input commands.

6. The system as recited in claim 1, further comprising surveillance modules configured to maintain real-time spatial relationships between objects within the second virtual representation and alert a user to potential dangers in the environment.

7. The system as recited in claim 1, further comprising an automated surveillance module configured to enable a passive surveillance of the environment without requiring any active analysis by a user.

8. The system as recited in claim 6, further comprising a communication unit configured to communicate surveillance information received from the surveillance modules to remote locations.

9. A method to provide a visual representation of an environment, the method comprising:
    providing an electronic output device, an electronic input device, sensor modules, and an electronic processing unit operationally connected to the output device and the input device and the sensor modules;
    receiving, by the processing unit, static environment information about topography or bathymetry of the environment;
    acquiring from the sensor modules real-time information about dynamic features within the environment;
    outputting, on the output device, a window on the output device that displays a first virtual representation in 3-dimensions of the topography or the bathymetry of a portion of the environment from a first viewpoint using the static environment information with a marker displayed in the first virtual representation, the marker identifying where on the first virtual representation a particular physical location in the environment is located;
    changing in the window on the output device to a second virtual representation in 3-dimensions of the topography or the bathymetry of a portion of the environment from a second viewpoint using the static environment information, the second viewpoint being different from the first viewpoint, the second virtual representation comprising the marker being displayed at a same fixed location within the window as the first virtual representation with the marker identifying where on the second virtual representation the particular physical location in the environment is located, selectively populating in real time the displayed first and second virtual representations with the respective acquired real-time information about dynamic features within the environment; and
    executing computer readable instructions which enable the user to use the input device to: position and reposition the marker in a displayed representation, rotate the displayed representation about an axis comprising the marker, adjust a zoom of the displayed representation, cause the displayed representation to follow topography or bathymetry of the environment's representation as the user moves the marker, and adjust a portion of the environment being displayed in the displayed representation by repositioning the marker.

\* \* \* \* \*